United States Patent
Girard et al.

(10) Patent No.: US 6,298,736 B1
(45) Date of Patent: Oct. 9, 2001

(54) DEVICE FOR MEASURING A TORQUE BETWEEN TWO COAXIAL SHAFTS

(75) Inventors: François Girard, Viroflay; Hugues Henri Raymond Linet, Courbevoie, both of (FR)

(73) Assignee: Hispano Suiza, Paris (FR)

( * ) Notice: Subject to any disclaimer, the term of this patent is extended or adjusted under 35 U.S.C. 154(b) by 0 days.

(21) Appl. No.: 09/353,797

(22) Filed: Jul. 15, 1999

(30) Foreign Application Priority Data

Jul. 23, 1998 (FR) .................................................. 98 09397

(51) Int. Cl.⁷ ....................................................... G01L 3/02
(52) U.S. Cl. ....................................................... 73/862.328
(58) Field of Search ....................... 73/862.328, 862.338, 73/862.329, 862.191, 862.321

(56) References Cited

U.S. PATENT DOCUMENTS

| 4,754,652 | * | 7/1988 | Coulter et al. | 73/862.19 |
| 5,524,485 | * | 6/1996 | Bernard et al. | 73/168 |
| 5,905,212 | * | 5/1999 | Moses et al. | 73/862.481 |

FOREIGN PATENT DOCUMENTS

| 196 50 477 | 4/1998 | (DE) . |
| 652 424 | 5/1995 | (EP) . |

\* cited by examiner

*Primary Examiner*—Benjamin R. Fuller
*Assistant Examiner*—Jewel V. Thompson
(74) *Attorney, Agent, or Firm*—Oblon, Spivak, McClelland, Maier & Neustadt, P.C.

(57) ABSTRACT

A device for measuring a torque between first and second coaxial shafts comprises a ring secured to one of the shafts and axially split so as to receive an axial key on the other shaft. The ring portions which are adjacent the key are operative to make the measurements and comprise flexible parts on which strain gauges are stuck.

4 Claims, 2 Drawing Sheets

DEVICE FOR MEASURING A TORQUE BETWEEN TWO COAXIAL SHAFTS

BACKGROUND OF THE INVENTION

1. Field of the Invention

The invention relates to a device for measuring a torque between two coaxial shafts.

2. Summary of the Prior Art

Devices for measuring a force acting between two solid bodies conventionally comprise a resilient non-rigid element which interconnects the bodies and which therefore undergoes considerable deformation in response to a force acting between them. After the device has been calibrated, measurement of the deformation enables the applied force to be determined. Various procedures are possible but one of the commonest is to stick strain gauges to the connecting element and to measure the variation in the resistance of conductors which are embedded in the gauge, the resistance varying as a function of the deformation.

These devices can be employed in many different ways, but the present invention is concerned with a device for measuring a torque between two coaxial shafts which combines the advantages of simplicity, ruggedness and compactness with sensitivity, accuracy and a very rapid transient response giving substantially instantaneous recording of any variation in torque.

SUMMARY OF THE INVENTION

Accordingly, the invention provides a device for measuring a torque between coaxial first and second shafts, comprising:

an axially split ring rigidly connected to said first shaft and defining an axial slot;

an axial key on said second shaft and received in said axial slot;

said ring having a main part and at least one tail which borders said axial slot and is separated from said first shaft;

said at least one tail comprising an end portion having a key-contacting surface, and a thin portion connecting said end portion to said main part of said ring, said thin portion extending in an axial or obliquely axial direction and having a surface defined by the thickness of said ring; and a strain gauge carried by said thin portion on said surface defined by the thickness of said ring.

Further preferred features and advantages of the invention will become apparent from the following description of a preferred embodiment, given by way of example only and with reference to the accompanying drawings.

DESCRIPTION OF THE PREFERRED EMBODIMENTS

Figure 1:
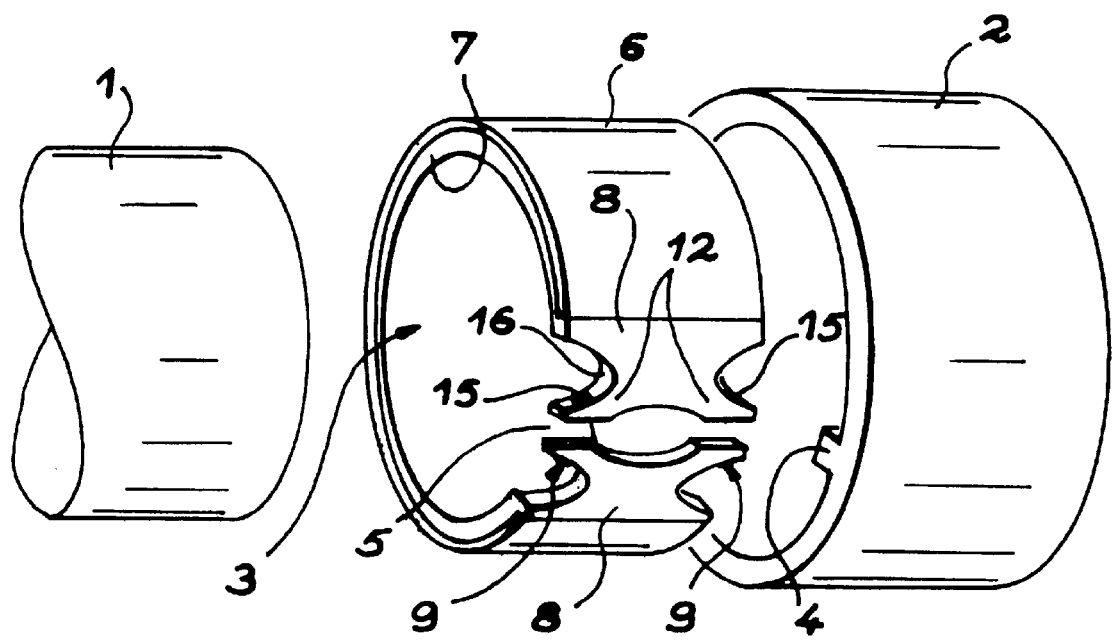
FIG. 1 shows an axially exploded view of one embodiment of the device in accordance with the invention.
Figure 4:
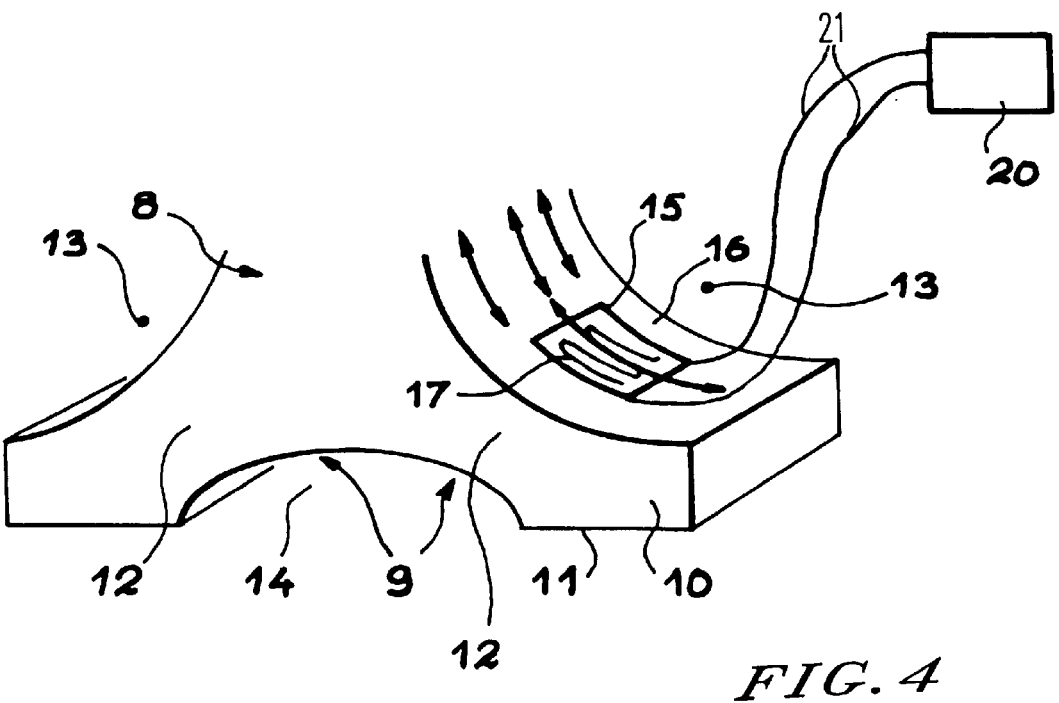

The main elements of the device in accordance with the invention are shown in exploded form in FIG. 1, wherein coaxial first and second shafts 1 and 2 are shown with a ring 3 which surrounds the first shaft 1 and which is axially split to define an axially extending slot 5 which receives an axially extending key 4 formed on the inside of the second shaft 2.

Figure 2:
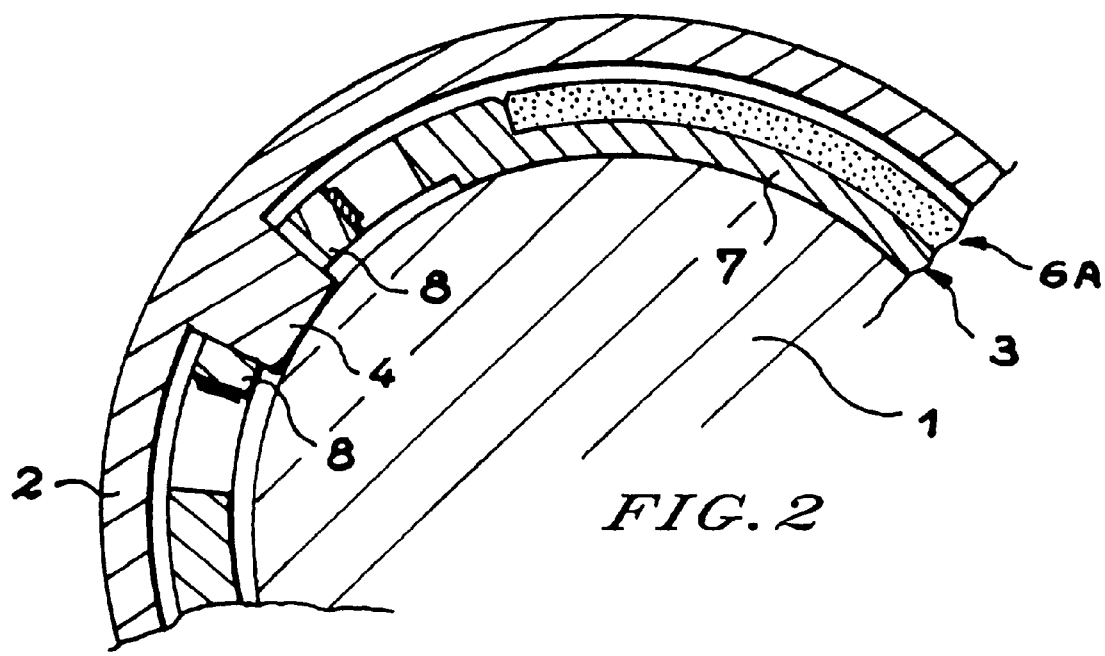
FIG. 2A is a partial cross-sectional view of the assembled device showing one variant of a bearing for the ring of the device.
FIG. 2B is a view similar to FIG. 2A but showing a second variant of the ring bearing; and, FIG. 3 is an enlarged perspective view of the measuring part of the ring.
Figure 3:
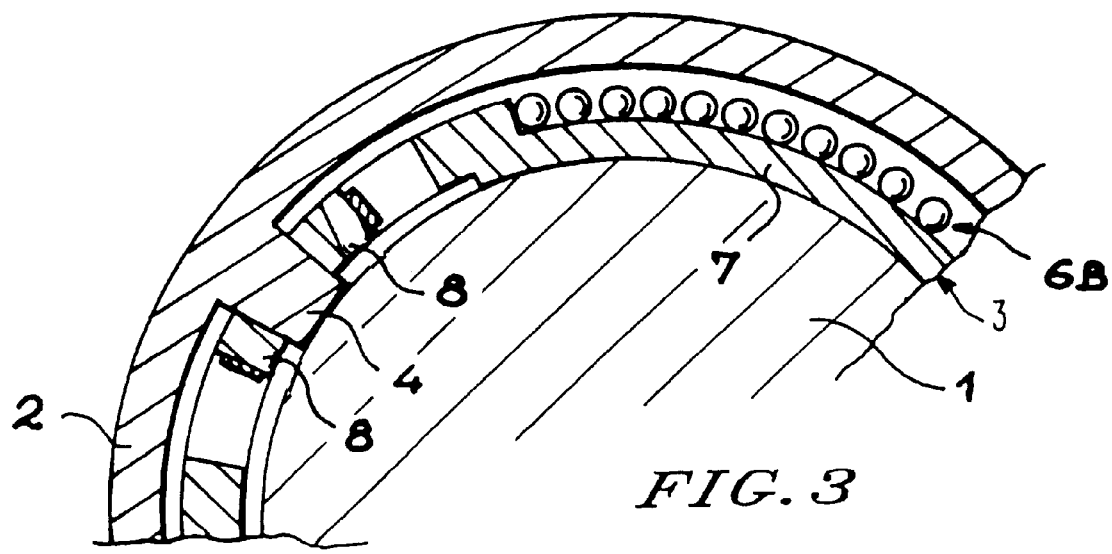

The ring 3 is rigidly connected to the first shaft 1, such as by shrink fitting, bonding, screwing, or any other means, and therefore provides an angular connection between the shafts 1 and 2 by way of the key 4. A bearing 6, which may comprise a needle bearing or a Teflon ring, extends around the major part 7 of the ring 3 and enables the ring 3 to be supported within the second shaft 2 with very little friction between them. These two bearing variants are shown in FIGS. 2A and 2B, which also show the arrangement of the ring 3 near the key 4. The main part 7 of the ring engages the first shaft 1, but in the region of the axial slot 5 which receives the key 4, the ring 3 comprises measuring parts 8 which are spaced from the first shaft 1 and which bracket the key 4 so as to lightly clamp it in order to prevent oscillation between the shafts 1 and 2 and hence avoid measurement errors which could result from such oscillation. One of the measuring parts 8 is shown more clearly in FIG. 3, and it will be understood that the other measuring part is the mirror image thereof. Each part 8 comprises a pair of tails 9, each consisting of a relatively thick end portion 10 which bears on the key 4 by way of a contact surface 11, and a thinned connecting portion 12 which connects the end portion 10 to the remainder of the ring 3. Such a shape can readily be produced by using a milling cutter to machine each of the three exposed surfaces of the measuring part 8 to form two lateral recesses 13 and a front recess 14 which bound and separate the tails 9. The thickness, and therefore the rigidity, of the connecting portions 12 depends of course upon the machining depth selected, which in turn depends upon the required sensitivity of the device.

The connecting portions 12 each carry a strain gauge 15 on an outside surface 16 thereof defined by the thickness of the ring 3. A torque acting between the shafts 1 and 2 creates forces acting on the surfaces 11 of the tails 9, and these forces are transmitted as bending forces to the connecting portions 12 and hence to the strain gauges 15.

The strain gauges 15 are of known construction and comprise a substrate layer which is bonded to the testing surface and in which a conductive wire 17 is embedded. Expansion or contraction of the wire 17 varies its resistance, and the variation can be measured by a Wheatstone bridge. The wires 17 are therefore oriented in the main deformation direction—i.e., the direction in which the tails 9 extend, and their ends are connected to measuring device 20 by electrical wiring. Since this technology is well known these elements have not been shown in detail. If the shafts 1 and 2 are substantially stationary connecting wiring connects the strain gauges 15 directly to a stationary external measuring device, but if the shafts 1 and 2 rotate, the circuit assembly comprises a stationary part and a part which accompanies the shafts, the two parts being interconnected by means of telemetry or brushes rubbing on circular contacts.

In the preferred embodiment illustrated, each measuring part 8 comprises a pair of tails 9 pointing axially in opposite directions, with the connecting portions 12 extending obliquely in a strongly axial direction. Each tail 9 is disposed opposite a corresponding tail 9 of the opposite measuring part 8, thus increasing the length over which the key 4 is clamped in the ring 3.

What is claimed is:

1. A device for measuring a torque between first and second shafts which are arranged coaxially to each other, said device comprising:

an axially split ring rigidly connected to said first shaft and coaxial therewith, said axially split ring defining an axial slot which is parallel to a central longitudinal axis of said first and second shafts;

a radially inwardly extending key disposed along an axial length on an inside of said second shaft, said radially inwardly extending key being received in said axial slot;

said axially split ring having a main part and at least one tail which borders said axial slot and which is separated from said first shaft;

said at least one tail including an end portion having a key-contacting surface, and a connecting portion connecting said end portion to said main part of said axially split ring, said connecting portion extending in either an axial or obliquely axial direction and having a surface defined by a thickness of said axially split ring; and a strain gauge carried by said thin portion on said surface defined by said thickness of said axially split ring, wherein a torque acting between said first and second shafts creates forces acting on said key-contacting surface of said at least one tail and said forces are transmitted as bending forces to said connecting portions and thereby to said strain gauge which is connected to a measuring device by electrical wiring.

2. The device according to claim 1, wherein said at least one tail is two pairs of tails, each pair of said two pairs of tails pointing in opposite axial directions of said radially inwardly extending key.

3. The device according to claim 2, wherein each tail of said two pairs of tails are disposed opposite one another and each pair of said two pairs of tails are disposed on opposite sides of said radially inwardly extending key.

4. The device according to claim 1, further comprising a bearing provided between said axially split ring and said second shaft.

* * * * *